July 4, 1961   C. L. VAN DAM   2,991,379
ELECTRIC BRUSH HOLDER
Filed Dec. 18, 1956

INVENTOR
CORNELIS LEENDERT VAN DAM

ATTORNEY

United States Patent Office 2,991,379
Patented July 4, 1961

2,991,379
ELECTRIC BRUSH HOLDER
Cornelis Leendert van Dam, Hengelo (Overijsel), Netherlands, assignor to N.V. Hollandse Signaalapparaten, Hengelo (Overijsel), Netherlands, a Dutch corporation
Filed Dec. 18, 1956, Ser. No. 629,068
Claims priority, application Great Britain Jan. 2, 1956
7 Claims. (Cl. 310—247)

The invention relates to a brush holder for electrical apparatus. In some cases serious difficulties arise when carbon or such like brushes, mounted in standard brush holders, are to cooperate with a slip ring or a collector which has a very high rotational speed; this is ecpecially the case when the diameter of the slip ring or of the collector is small. For instance, abnormal high wear was found to occur in the case of the negative brush, that is the brush which takes the current from the collector. In a small direct current servo motor, the maximum rotational speed of which was as high as 20,000 revolutions per minute, this brush was in some cases completely worn within a few hours. Such a servo motor, moreover, did not reach its required no-load speed when the positive brush, that is, the brush which leads the current to the collector, rested on this collector with a pressure of standard value.

The rotational speed at no-load of such a servo motor increases when the pressure of the positive brush is increased, in spite of the fact that brush friction, which provides a substantial part of the motor load at no-load condition, increases as a result of the increase of the brush pressure. At a brush pressure of standard value, moreover, heavy sparking was found to occur at the positive brush, this sparking being reduced by increasing the brush pressure, whilst abnormally high collector wear was established. An increase in the brush pressure of a small servomotor is highly undesirable. When the servo motor is at rest, the brush friction impedes the starting, resulting in the servo motor remaining at rear at low control voltages, thus causing unacceptable misalignments. Increasing the brush pressure, moreover, does not provide a solution to the problem of the rapid wear of the brush which takes the current from the rotating part. According to the invention an electric brush holder is mounted in such a way that a line which intersects the rotational axis of the device on which the brush rests as well as the trajectory described by the brush on the surface of this device, and which is parallel to the direction in which the brush is able to move in its working position, is not perpendicular to the said surface of the said device at its point of intersection with this surface. In such a brush holder the life of the brush which takes the current from the rotating part is substantially increased. Sparking at the brush which leads the current to the rotating part is substantially reduced by mounting the said brush in a brush holder according to the invention, whilst the wear of the part on which this brush runs is reduced to normal values. Finally, the rotational speed at no-load of a servo motor, the positive brush of which is mounted in a brush holder according to the invention is substantially higher at the same armature voltage. An oscillogram of the armature current of a servo motor, provided with standard brush holders in which the brush is able to move in a direction perpendicular to the collector surface, shows large, peaked variations, which variations cause the average value of the armature current to be reduced. The motor power and the no-load speed are also reduced simultaneously with the armature current. The peaked variations are decreased when the brush pressure is substantially increased. When the positive brush of a servo motor, which in other respects remains unchanged, is mounted in a brush holder according to the invention, then the peaked variations of the armature current are substantially suppressed, even at brush pressures of standard value, whilst sparking at the positive brush as well as collector wear are reduced to normal values, the no-load speed being, moreover, increased. In one particular case an increase of the no-load speed from 12,000 to 24,000 revolutions per minute was established. When the negative brush of the servo motor is also mounted in a brush holder according to the invention, excessive wear of this brush no longer occurs, as has been stated above. It is not clear which phenomena are responsible for the advantages of the new brush holder according to the invention. A better understanding of the effect of this new brush holder may be obtained when one considers that a carbon brush in a brush holder of the standard type in which this brush is able to move in a direction perpendicular to the surface of the collector or the slip ring, experiences only slight resistance to those motions which are made possible by the play of the brush in the brush holder. In the brush holder according to the invention on the contrary such motions are opposed by substantial forces which are the result either of the friction of the brush in the holder or of certain measures which will be mentioned below.

When a slip ring or a collector on which a brush in a brush holder according to the invention rests, is required to be able to rotate in two directions, then the brush holder must be mounted in such a way that the motion of the brush is directed towards the rotational axis of the collector or the slip ring, this direction of motion, however, not being perpendicular to the surface of this collector or slip ring. When the collector or slip ring normally rotates in one direction only, then it may be advantageous if the motion of the brush in the brush holder is not directed towards the rotational axis of the collector or of the slip ring but slightly obliquely in the direction in which the said slip ring or collector normally rotates, as is the case in many brush holders of standard type.

A very effective brush holder will be obtained when the opening or canal which contains the brush is provided with a guide or guides, the direction of which corresponds to the direction of motion of the brush in the brush holder, such a guide being situated in such a way that a corresponding guide on the brush is caused to cooperate with the former guide by the forces which keep the brush in contact with the rotating device on which it rests. The brush will then be very stable. Such a form of the brush holder according to the invention can be very simply obtained when a brush, the cross section of which is a square, a rectangle, a diamond or a polygon, is supported in a brush holder, the opening of which has a cross section corresponding to the cross section of the brush, provided that this brush holder is mounted in such a way that as a result of the forces exerted on the brush the faces of the brush which adjoin two longitudinal edges of the brush, which are oppositely situated, are pressed against the corresponding parts of the walls of the opening in the brush holder. It is not necessary that the cross section of the opening of the brush holder and the cross section of the brush should correspond completely. It will suffice if the walls of the opening which adjoin the said edges correspond to the cross section of the brush, and a hexagonal brush may, for instance, be supported in a brush holder according to the invention, the cross section of the opening of which is diamond shaped. Two forms of brush holders according to the invention will now be discussed with reference to the drawings.

Figure 1:
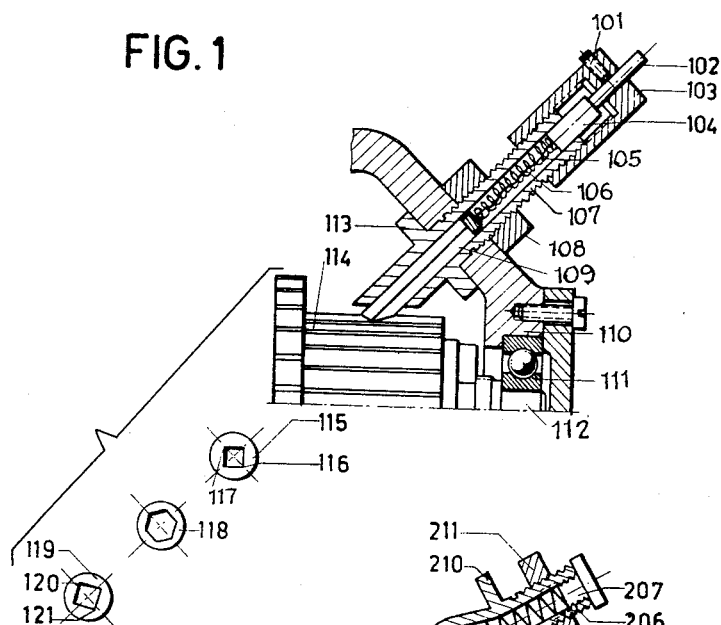
FIG. 1 shows a cross section of a small direct current servo motor provided with a brush holder according to the invention.

In FIG. 1 part 112 is one end of the armature shaft of a servo motor, this end being rotatably mounted by means of a ball bearing 111 in a plastic cover 110 of the servo motor housing. Part 114 is the collector of the servo motor, and a brush 109, held in a brush holder 107, rests on this collector. The brush holder is mounted in the plastic cover 110 of the motor housing by means of a nut 108 and a flange 113. The cross section of the brush is square, and this brush is able to move longitudinally in the brush holder in an opening of corresponding cross section. The brush holder is mounted in such a way in the plastic cover that two oppositely situated edges of the above opening are situated in a plane which passes through the centre line of the armature shaft 112. The brush 109 is provided with a flexible conductor 106 which electrically joins it to a part 104 which fits accurately into the opening of the brush holder and carries a small rod 102. A spring 105 is situated between the part 104 and the brush 109, and provides the force by means of which the brush is pressed against the collector. After the brush 109 and the part 104 are inserted in the brush holder, a cover 103 is screwed onto this brush holder. The rod 102 will then project through an opening in the cover, and can be fixed in this cover by means of a set screw 101 so as to ensure a good electric contact and to adjust the spring pressure to the correct value. The brush holder is mounted in such a way that its centre line intersects the centre line of the shaft 112 of the armature and that the angle between the centre line of the brush holder and the surface of the collector, at the spot where the brush is in contact with this surface, is approximately 45°. In the vicinity of the collector the edge of the brush holder is shaped in such a way that it is situated on a cylindrical surface which is coaxial with the collector surface and very near to the latter surface. The position of the brush in the holder is shown in the cross section 115 and it is obvious that this brush, as a result of the force exerted on it by the spring 105 and the collector, will rest against the brush holder at the points 116 and 117, or at any rate at the point 117. Consequently, the position of the brush in the holder is completely determined and vibrations of the brush in the holder will not occur. It is not necessary for the angle between the centre line of the brush holder and the surface of the collector to be exactly 45°, but experience has shown that the best results are obtained with brush holders the position of which is such that the said angle does not deviate considerably from 45°.

In a servo motor provided with a brush holder according to the cross section 115, commutation is effected whilst the collector segment which is connected to the winding in which the current is to be reversed, is situated below a part of the brush the cross section of which is very small. This has the advantage that the resistance of the brush in the circuit in which the current is reversed is fairly high, but the disadvantage that the commutation spark occurs at a moment at which only a very small part of the brush surface is available. Consequently, the corner of the brush on the side where the collector segments leave this brush, shows substantial damage as a result of sparking. This is, to be sure, not a very serious disadvantage as the damage is restricted to a small part only of the surface of the brush resting on the collector, but it is none the less undesirable and can be prevented in a simple way by changing the cross section of the brush. For this purpose the brush can be given a hexagonal cross section positioned as shown at 118 in FIG. 1, the brush holder being positioned in such a way that two diametrically placed edges of the brush are situated in a plane through the centre line of the armature shaft 112. The commutation now occurs at a spot where the cross section of the brush is considerably larger. The results obtained by a hexagonal brush can be approximated by means of a brush, the cross section of which is a square or a rectangle, by mounting the brush holder as shown at 119 in FIG. 1. In such a brush holder the play of the brush in the holder will be rendered sufficiently harmless, because the forces exerted on the brush will cause the edges 120 and 121 of the brush to be pressed with sufficient force against the corresponding parts of the brush holder. Within the scope of the invention various cross sections of brushes and positions of the brush holders can be applied, for instance a diamond shaped cross section of the brush in which two lateral faces of the brush are parallel to the centre line of the armature shaft.

When applied in a direct-current servo motor, the armature of which is continuously fed by a constant voltage, the control of the rotational speed being effected by changing the exciting current, a type of servo motor which is extensively applied in servo motor technique, the brush holder according to the invention has still further advantages. When the field strength in such a servo motor is reduced to zero in order to bring the servo motor shaft to a standstill, it appears that in the case of brush holders of standard type being used, the armature and the motor shaft will not remain stationary, but will vibrate in a very undesirable manner about an arbitrary position. By applying a brush holder according to the invention such vibrations of the motor shaft are successfully prevented.

Figure 2:
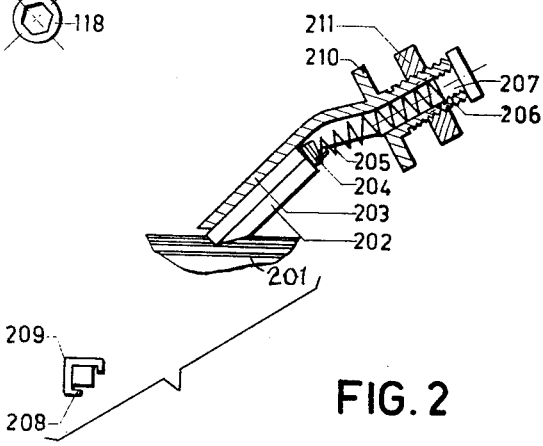
FIG. 2 shows a special form of a brush holder according to the invention.

A very suitable mounting of the brush can be obtained by using a brush holder according to the invention, in which the brush is only supported by two adjoining plane surfaces forming a groove- or channel-shaped guide for the brush. Such a brush holder is shown in FIG. 2. The brush 202 in this brush holder rests in a V-shaped groove, the cross section of which is shown at 209. The angle between the lateral faces of the brush, which must rest against the walls of the groove is equal to the angle between the said walls of the groove. The guide for the brush is provided with edges such as 208, which edges do not form guides for the brush, but which serve to prevent the brush from leaving the groove whilst it is being inserted into the brush holder. At the upper end of the brush a spring is fitted. The other extremity of this spring is situated in a tube-shaped part 206 of the brush holder, and is enclosed under a screw or bolt 207. The tube-shaped part has such a direction with respect to the guide for the brush that the direction in which a force is exerted by the spring deviates from the direction of the guide of the brush. Consequently, the upper part of the brush is pressed by the spring against the walls of the guide. At the lower side of the brush the collector presses the brush against the surfaces of the guide. The position of the brush in the brush holder is consequently completely determined, and no vibrations of the brush can occur. The tube-shaped element 206 which carries the guide 203 is mounted in the motor housing by means of a flange 210 and a nut 211. It is an advantage of the construction of the brush holder according to FIG. 2 that a complete and exact adaptation of the cross section of the brush to the cross section of the brush holder is not necessary. The guide of the brush can also take the form of an enclosed channel-shaped element, provided that its cross section is larger than the cross section of the brush, which need only be supported by two adjoining walls of the channel-shaped element. The angle between the direction of the spring and the direction in which the brush can move need only be a very small one so that the shape of the complete brush holder can be that of a straight channel-like element, provided that suitable measures are taken to press the part of the brush situated away from the collector against the guide, for instance, by mounting the spring which rests on the brush in a direction which deviates a little from the direction of motion of the brush in the guide.

What I claim is:

1. In a reversible electric apparatus including a rotatable member having a longitudinal axis with a concentric cylindrical collector surface supported for rotation in opposite directions about said longitudinal axis, a brush holder supported upon said apparatus, said brush holder comprising a channel guide directed at an acute angle to said longitudinal axis of rotation of said rotatable member, a brush slidably supported within said guide channel, and spring means carried by said holder yieldably urging said brush into guided relationship with said guide channel and toward said collector surface of said rotatable member at said acute angle, said guide channel being of constant polygonal cross section corresponding to the cross section of the brush, the plane passing through two oppositely situated lines of intersection of adjoining parts of the walls of the guide channel being parallel to the rotational axis of the rotatable member on which the brush in the brush holder rests.

2. In an apparatus according to claim 1, wherein the angle between the direction of motion of the brush in its working position in the brush holder and the surface of the rotatable member on which the brush rests at the spot where this member is in contact with the brush is approximately 45°.

3. In an apparatus having a brush holder for holding a brush at one end in slidable contact engagement with a rotary generally cylindrical current carrier, said brush holder comprising a brush supporting member including a brush receiving elongated guide channel having at least two plane sides meeting at an angle and defining two opposite edges, said edges being situated in a plane parallel to the rotational axis of said carrier and the longitudinal axis of said channel intersecting said rotational axis at an angle, and yieldable means supported by said member, said yieldable means abutting against the other end of a brush inserted in the channel to bias the brush toward said carrier and against said channel walls.

4. In an apparatus having a brush holder for holding a brush at one end in slidable contact engagement with a rotary generally cylindrical current carrier, said brush holder comprising a brush supporting member including a brush receiving elongated guide channel of polygonal cross-section, two opposite edges of said channel being situated in a plane parallel to the rotational axis of said carrier and the longitudinal axis of the channel intersecting said rotational axis at an angle, and yieldable means supported by said member, said yieldable means abutting against the other end of a brush inserted in the channel to bias the brush toward said carrier and against the walls of said channel.

5. In an apparatus according to claim 4, wherein said yieldable means comprises a loaded coil spring in said channel, abutting with one end against the respective end of an inserted brush, and wherein an abutment member supported on said support member protrudes into said channel to form an abutment for the other end of the spring.

6. In an apparatus having an electric brush of polygonal cross-section and a brush holder for holding the brush at one end in slidable contact engagement with a rotary generally cylindrical current carrier, said brush holder comprising a support member including an elongated guide channel of polygonal cross-section for slidably receiving the brush therein, two opposite edges of said channel being situated in a plane substantially parallel to the rotational axis of said carrier and the longitudinal axis of the channel intersecting said rotational axis at an angle, and yieldable means supported by said support member, said yieldable means abutting against the other end of said brush to bias the same toward said carrier and against the walls of said channel.

7. In an apparatus according to claim 6, yieldable means in the form of a loaded coil spring abutting on one end against the respective end of the brush, and an abutment member supported on said support member abutting against the other end of the spring.

References Cited in the file of this patent
UNITED STATES PATENTS

| | | |
|---|---|---|
| 490,449 | Lundell | Jan. 24, 1893 |
| 2,515,768 | Gardiner | July 18, 1950 |
| 2,821,642 | Tooke | Jan. 28, 1958 |

FOREIGN PATENTS

| | | |
|---|---|---|
| 542,203 | France | May 13, 1922 |
| 886,865 | France | July 19, 1943 |